US011975348B2

(12) United States Patent
Cacciatore et al.

(10) Patent No.: US 11,975,348 B2
(45) Date of Patent: May 7, 2024

(54) LIQUID DISPENSING SYSTEM COMPRISING AN UNITARY DISPENSING NOZZLE

(71) Applicant: The Procter & Gamble Company, Cincinnati, OH (US)

(72) Inventors: Justin Thomas Cacciatore, Cincinnati, OH (US); Chong Gu, Beijing (CN); Scott William Capeci, North Bend, OH (US); Ilse Maria Cyrilla D'Haeseleer, Dendermonde (BE); Vincenzo Guida, Woluwe Saint Pierre (BE); Boon Ho Ng, Beijing (CN); Qi Zhang, Beijing (CN)

(73) Assignee: The Procter & Gamble Company, Cincinnati, OH (US)

( * ) Notice: Subject to any disclaimer, the term of this patent is extended or adjusted under 35 U.S.C. 154(b) by 649 days.

(21) Appl. No.: 17/104,200

(22) Filed: Nov. 25, 2020

(65) Prior Publication Data

US 2021/0187527 A1 Jun. 24, 2021

(30) Foreign Application Priority Data

Dec. 16, 2019 (WO) ................ PCT/CN2019/125654

(51) Int. Cl.

*B05B 7/08* (2006.01)
*B05B 1/16* (2006.01)
*B05B 1/30* (2006.01)

(52) U.S. Cl.

CPC .............. *B05B 7/08* (2013.01); *B05B 1/1609* (2013.01); *B05B 1/3013* (2013.01)

(58) Field of Classification Search

CPC ........ B05B 7/08; B05B 1/3013; B05B 1/1609
See application file for complete search history.

(56) References Cited

U.S. PATENT DOCUMENTS

| | | | |
|---|---|---|---|
| 2,669,946 | A | 2/1954 | Peyton |
| 2,771,913 | A | 11/1956 | Flasnocker |
| 2,887,133 | A | 5/1959 | Breeback |
| 2,919,836 | A | 1/1960 | Limpert |
| 2,927,781 | A | 3/1960 | Fohrhaltz et al. |
| 2,986,915 | A | 6/1961 | Nau |
| 3,114,536 | A | 12/1963 | Demaison |

(Continued)

FOREIGN PATENT DOCUMENTS

| | | | |
|---|---|---|---|
| CA | 1098058 | A | 3/1981 |
| CA | 2230821 | A1 | 9/1998 |

(Continued)

OTHER PUBLICATIONS

All Office Actions; U.S. Appl. No. 17/376,605, filed on Jul. 15, 2021.

(Continued)

*Primary Examiner* — Vishal Pancholi
*Assistant Examiner* — Robert K Nichols, II
(74) *Attorney, Agent, or Firm* — Gary J. Foose

(57) ABSTRACT

A liquid dispensing system for dispensing two or more liquids of different composition, viscosity, solubility and/or miscibility at high filling speeds into a container through a unitary dispensing nozzle to improve homogeneous mixing of such liquids, while said nozzle is an integral piece free of any movable parts.

20 Claims, 20 Drawing Sheets

(56) References Cited

U.S. PATENT DOCUMENTS

| | | | |
|---|---|---|---|
| 3,128,994 | A | 4/1964 | Pillman |
| 3,427,999 | A | 2/1969 | Schultz |
| 3,559,700 | A | 2/1971 | Erickson |
| 3,631,818 | A | 1/1972 | Zito |
| 3,877,682 | A | 4/1975 | Moss |
| 3,913,801 | A | 10/1975 | Wise et al. |
| 3,960,295 | A | 6/1976 | Horak |
| 4,022,379 | A | 5/1977 | Ladisch |
| 4,218,014 | A | 8/1980 | Tracy |
| 4,375,826 | A | 3/1983 | Stohlquist et al. |
| 4,388,338 | A | 6/1983 | Wittenborg |
| 4,392,588 | A | 7/1983 | Scalera |
| 4,512,379 | A | 4/1985 | Hennig |
| 4,676,279 | A | 6/1987 | Von Lersner |
| 4,711,277 | A | 12/1987 | Clish |
| 4,753,370 | A | 6/1988 | Rudick |
| 4,834,545 | A | 5/1989 | Inoue et al. |
| 4,928,854 | A | 5/1990 | Mccann et al. |
| 5,033,651 | A | 7/1991 | Whigham et al. |
| 5,129,551 | A | 7/1992 | Gott |
| 5,203,366 | A | 4/1993 | Czeck et al. |
| 5,203,474 | A | 4/1993 | Haynes |
| 5,260,154 | A | 11/1993 | Forrest |
| 5,324,109 | A | 6/1994 | Johari |
| 5,339,874 | A | 8/1994 | Cragun |
| 5,353,958 | A | 10/1994 | Hawkins |
| 5,375,634 | A | 12/1994 | Egger |
| 5,414,778 | A | 5/1995 | Schwartz |
| 5,419,348 | A | 5/1995 | Kuta |
| 5,547,725 | A | 8/1996 | Barrows et al. |
| 5,590,976 | A | 1/1997 | Kilheffer et al. |
| 5,834,416 | A | 11/1998 | Morgan et al. |
| 5,899,244 | A | 5/1999 | Nish et al. |
| 5,964,378 | A | 10/1999 | Sperry et al. |
| 5,967,367 | A | 10/1999 | Orsborn |
| 6,010,032 | A | 1/2000 | Vermylen et al. |
| 6,076,750 | A | 6/2000 | Mykkaenen et al. |
| 6,173,862 | B1 | 1/2001 | Buca et al. |
| 6,401,981 | B1 | 6/2002 | Mccann et al. |
| 6,402,841 | B1 | 6/2002 | Vesterlund et al. |
| 6,415,991 | B1 | 7/2002 | Eriksson |
| 6,475,973 | B1 | 11/2002 | Mondin |
| 6,533,195 | B2 | 3/2003 | Sinders |
| 6,837,228 | B2 | 1/2005 | Baasch |
| 6,991,004 | B2 | 1/2006 | Kaufhold et al. |
| 7,000,656 | B2 | 2/2006 | Todd |
| 7,048,148 | B2 | 5/2006 | Roekens et al. |
| 7,226,631 | B2 | 6/2007 | Thakur et al. |
| 7,344,298 | B2 | 3/2008 | Wilmer et al. |
| 7,358,457 | B2 | 4/2008 | Peng |
| 7,559,346 | B2 | 7/2009 | Herrick et al. |
| 7,661,352 | B2 | 2/2010 | Sher et al. |
| 7,690,405 | B2 | 4/2010 | Miller et al. |
| 7,918,435 | B2 | 4/2011 | Page |
| 7,958,910 | B2 | 6/2011 | Nakamori et al. |
| 8,020,590 | B2 | 9/2011 | Togni |
| 8,025,792 | B2 | 9/2011 | Delesdernier et al. |
| 8,240,908 | B2 | 8/2012 | Williams et al. |
| 8,430,273 | B2 | 4/2013 | Brouwer |
| 8,590,814 | B2 | 11/2013 | Gilpatrick et al. |
| 8,602,633 | B2 | 12/2013 | McLaughlin et al. |
| 8,616,760 | B2 | 12/2013 | Williams et al. |
| 8,616,761 | B2 | 12/2013 | McLaughlin et al. |
| 8,667,996 | B2 | 3/2014 | Gonnelli et al. |
| 8,931,948 | B2 | 1/2015 | Coy |
| 9,073,023 | B2 | 7/2015 | Bernard |
| 9,114,087 | B2 | 8/2015 | Wei et al. |
| 9,114,417 | B2 | 8/2015 | Sakamoto |
| 9,233,484 | B2 | 1/2016 | Larson |
| 9,359,583 | B2 | 6/2016 | Corona, III et al. |
| 9,415,992 | B2 | 8/2016 | Ryan et al. |
| 9,505,506 | B2 | 11/2016 | Ammann |
| 9,675,530 | B2 | 6/2017 | Focht et al. |
| 9,720,425 | B2 | 8/2017 | Goudy et al. |
| 9,918,584 | B2 | 3/2018 | Bergdahl et al. |
| 10,470,974 | B2 | 11/2019 | Sanders et al. |
| 10,507,479 | B2 | 12/2019 | Bertness et al. |
| 10,706,529 | B2 | 7/2020 | Zonfrilli et al. |
| 10,814,291 | B2 | 10/2020 | Chen et al. |
| 2001/0031718 | A1 | 10/2001 | Kaess |
| 2002/0056721 | A1 | 5/2002 | Phillips et al. |
| 2003/0121561 | A1 | 7/2003 | Wagner et al. |
| 2004/0026463 | A1 | 2/2004 | Airaksinen |
| 2004/0036185 | A1 | 2/2004 | Garcia |
| 2004/0101204 | A1 | 5/2004 | King |
| 2004/0219269 | A1 | 11/2004 | Cathenaut et al. |
| 2004/0231525 | A1 | 11/2004 | Ikuta |
| 2005/0058748 | A1 | 3/2005 | Bourguignon |
| 2005/0087562 | A1 | 4/2005 | Koide et al. |
| 2005/0092386 | A1 | 5/2005 | Kaufhold et al. |
| 2005/0217270 | A1 | 10/2005 | Sampath et al. |
| 2007/0044824 | A1 | 3/2007 | Capeci |
| 2007/0114244 | A1 | 5/2007 | Gatipon |
| 2007/0205220 | A1 | 9/2007 | Rudick et al. |
| 2007/0245694 | A1 | 10/2007 | Schmal et al. |
| 2008/0031085 | A1 | 2/2008 | McLaughlin |
| 2008/0140261 | A1 | 6/2008 | Hansen |
| 2008/0191056 | A1 | 8/2008 | Delesdernier et al. |
| 2008/0245282 | A1 | 10/2008 | Richards |
| 2009/0014464 | A1 | 1/2009 | Adbelmoteleb et al. |
| 2009/0039180 | A1 | 2/2009 | Lukasiewicz |
| 2009/0236007 | A1 | 9/2009 | Clusserath et al. |
| 2009/0236364 | A1 | 9/2009 | Njaastad et al. |
| 2010/0237099 | A1 | 9/2010 | Carpenter et al. |
| 2011/0039044 | A1 | 2/2011 | Cluesserath |
| 2011/0177220 | A1 | 7/2011 | Bergdahl |
| 2011/0200718 | A1 | 8/2011 | Swertvaegher et al. |
| 2011/0214779 | A1 | 9/2011 | Goldman et al. |
| 2011/0259365 | A1 | 10/2011 | Schuetz et al. |
| 2011/0264284 | A1 | 10/2011 | Rudick et al. |
| 2011/0297274 | A1 | 12/2011 | Hilliard, Jr. |
| 2011/0319312 | A1 | 12/2011 | Schwerter et al. |
| 2012/0097764 | A1 | 4/2012 | Larson |
| 2012/0168652 | A1* | 7/2012 | Saine .................... B05C 5/0237 251/12 |
| 2012/0230148 | A1 | 9/2012 | van Opstal et al. |
| 2013/0014857 | A1 | 1/2013 | Kinds et al. |
| 2013/0029894 | A1 | 1/2013 | Fong et al. |
| 2013/0105041 | A1 | 5/2013 | Krulitsch et al. |
| 2013/0125508 | A1 | 5/2013 | Honda |
| 2014/0085324 | A1 | 3/2014 | Charvet et al. |
| 2014/0150670 | A1 | 6/2014 | Green et al. |
| 2014/0153391 | A1 | 6/2014 | Ludwig et al. |
| 2014/0182743 | A1 | 7/2014 | Trulaske et al. |
| 2014/0263413 | A1 | 9/2014 | Green |
| 2014/0263760 | A1 | 9/2014 | Hanna |
| 2014/0326360 | A1 | 11/2014 | Ammann |
| 2014/0352260 | A1 | 12/2014 | Pinna |
| 2015/0020916 | A1 | 1/2015 | Menon |
| 2015/0165403 | A1 | 6/2015 | Lutz et al. |
| 2015/0283565 | A1 | 10/2015 | Strand |
| 2015/0337236 | A1 | 11/2015 | Tang |
| 2015/0374609 | A1 | 12/2015 | Cetti et al. |
| 2016/0024441 | A1 | 1/2016 | Cosgrove et al. |
| 2016/0032225 | A1 | 2/2016 | Kavchok et al. |
| 2016/0114527 | A1 | 4/2016 | Goudy |
| 2016/0215240 | A1 | 7/2016 | Acra et al. |
| 2016/0228891 | A1 | 8/2016 | Rosko |
| 2017/0056847 | A1 | 3/2017 | Miller et al. |
| 2017/0102720 | A1 | 4/2017 | Goudy et al. |
| 2017/0312707 | A1 | 11/2017 | Park |
| 2017/0348707 | A1 | 12/2017 | Yattara et al. |
| 2018/0036752 | A1 | 2/2018 | Breingan |
| 2018/0168185 | A1 | 6/2018 | Moreau |
| 2018/0276885 | A1 | 9/2018 | Singh et al. |
| 2018/0353914 | A1 | 12/2018 | Ng et al. |
| 2018/0353915 | A1 | 12/2018 | Chen |
| 2018/0354767 | A1 | 12/2018 | Cacciatore et al. |
| 2018/0354769 | A1 | 12/2018 | Cacciatore et al. |
| 2018/0354770 | A1 | 12/2018 | Cacciatore et al. |
| 2018/0355290 | A1 | 12/2018 | Capeci et al. |
| 2018/0357759 | A1 | 12/2018 | Zonfrilli |
| 2019/0389708 | A1 | 12/2019 | Cacciatore et al. |

(56) References Cited

U.S. PATENT DOCUMENTS

| | | | |
|---|---|---|---|
| 2019/0389709 A1 | 12/2019 | Cacciatore et al. |
| 2021/0339996 A1 | 11/2021 | Cacciatore et al. |
| 2022/0024746 A1 | 1/2022 | Cacciatore et al. |

FOREIGN PATENT DOCUMENTS

| | | | |
|---|---|---|---|
| CA | 2313452 | C | 11/2006 |
| CN | 88101288 | A | 9/1988 |
| CN | 1195604 | A | 10/1998 |
| CN | 1485142 | A | 3/2004 |
| CN | 101249393 | A | 8/2008 |
| CN | 102034107 | | 4/2011 |
| CN | 202107096 | U | 1/2012 |
| CN | 102341161 | A | 2/2012 |
| CN | 103328623 | A | 9/2013 |
| CN | 103721880 | A | 4/2014 |
| CN | 104222471 | A | 12/2014 |
| CN | 204210780 | U | 3/2015 |
| CN | 204433102 | U | 7/2015 |
| CN | 105046681 | A | 11/2015 |
| CN | 205241198 | U | 5/2016 |
| CN | 105709652 | A | 6/2016 |
| CN | 105940257 | A | 9/2016 |
| CN | 106506901 | | 3/2017 |
| DE | 690574 | C | 4/1940 |
| DE | 9404096 | U1 | 5/1994 |
| DE | 102005031682 | A1 | 1/2007 |
| EP | 0829530 | A1 | 3/1998 |
| EP | 1947169 | A1 | 7/2008 |
| EP | 2561859 | A1 | 2/2013 |
| EP | 2650253 | A1 | 10/2013 |
| EP | 2848579 | A1 | 3/2015 |
| EP | 2361873 | A3 | 5/2015 |
| EP | 2490949 | B1 | 8/2016 |
| GB | 736131 | A | 8/1955 |
| GB | 2231624 | A | 11/1990 |
| GB | 2256636 | A | 12/1992 |
| GB | 2269761 | A | 2/1994 |
| JP | S5333539 | U | 3/1978 |
| JP | H03240627 | A | 10/1991 |
| JP | H0539224 | A | 2/1993 |
| JP | H0554203 | U | 7/1993 |
| JP | H0646752 | A | 2/1994 |
| JP | H074303 | U | 1/1995 |
| JP | H07101402 | A | 4/1995 |
| JP | H07124500 | A | 5/1995 |
| JP | H07315489 | A | 12/1995 |
| JP | H08156902 | A | 6/1996 |
| JP | 2000085706 | A | 3/2000 |
| JP | 2000247302 | A | 9/2000 |
| JP | 2003170004 | A | 6/2003 |
| JP | 2006188276 | A | 7/2006 |
| JP | H7156998 | A | 6/2007 |
| JP | 3134790 | U | 8/2007 |
| JP | 2007268488 | A | 10/2007 |
| JP | 2007296486 | A | 11/2007 |
| JP | 2008110803 | A | 5/2008 |
| JP | 2011126597 | A | 6/2011 |
| KR | 101207026 | B1 | 11/2012 |
| KR | 20140069844 | A | 6/2014 |
| SU | 1599112 | A1 | 10/1990 |
| WO | 9511830 | A1 | 5/1995 |
| WO | 9708233 | A1 | 2/1997 |
| WO | 2007111898 | A2 | 10/2000 |
| WO | 03097516 | A1 | 11/2003 |
| WO | 2005037970 | A2 | 4/2005 |
| WO | 2010034722 | A1 | 4/2010 |
| WO | 2011049505 | A4 | 7/2011 |
| WO | 2011133456 | A1 | 10/2011 |
| WO | 2013176921 | A1 | 11/2013 |
| WO | 2014197618 | A3 | 2/2015 |
| WO | 2017060453 | A1 | 4/2017 |

OTHER PUBLICATIONS

All Office Actions; U.S. Appl. No. 17/480,581, filed Sep. 21, 2021.

PCT Suppl. Search Report and Written Opinion for PCT/CN2019/125654 dated Jun. 15, 2022, 10 pages.

Joy Product Safety Sheer, https://www.pgproductsafety.conn/productsafety/ingredients/Joy Lennon.pdf, Date Unavailable (Year:2018).

Mr. Clean Product Safety Sheer, https://www.pgproductsafety.conn/productsafety/ingredients/household care/cleaners/MrClean/Mr Clean Multi Surfaces Liquid Ultimate Orange.pdf, Jul. 28, 2011 (Year: 2011).

Karami et al., "A novel image analysis approach for evaluation of mixing uniformity in drug-filled silicone rubber matrix" International Journal of Pharmaceutics 460 (2014) 158-164.

Van der Mijnsbrugge et al., "Image analysis of dough development: Impact of mixing parameters and wheat cultivar on the gluten phase distribution", Journal of Food Engineering 171 (2016) 102-110.

PCT Search Report and Written Opinion for PCT/CN2019/125654 dated Sep. 10, 2020.

All Office Actions, U.S. Appl. No. 16/436,967.

All Office Actions, U.S. Appl. No. 16/001,970.

All Office Actions, U.S. Appl. No. 16/001,965.

All Office Actions; U.S. Appl. No. 16/001,974.

All Office Actions: U.S. Appl. No. 16/001,979.

All Office Actions; U.S. Appl. No. 16/002,532.

All Office Actions: U.S. Appl. No. 16/002,560.

All Office Actions; U.S. Appl. No. 16/002,574.

Alvarado et al., "An Image Analysis Method for the Measurement of Mixing Times in Stirred Vessels", Chemical and Engineering Technology 34 (2011), No. 6, 859-866.

Decombas, Marc et al.—A New Object Based Quality Metric Based on SIFT and SSIM, International Conference on IEEE, Sep. 30, 2012, 4 pages.

Eaton Vickers (Catalog) PVM Variable Displacement Piston Pumps—Vickers Product Line, pp. 3 and 8, published Apr. 1, 2015 (Year: 2015).

Harf, "Liquid Coffee Dispensers and Concentrate," Aquapresso, Nov. 12, 2014. (Year: 2014).

Juez et al., "Monitoring of Concrete Mixing Evolution Using Image Analysis", Powder Technology 305 (2017) 477-487.

Li et al., "Three-Dimensional Image Analysis of Mixing in Stirred Vessels", AIChE Journal, vol. 45, No. 9 (Sep. 1999) 1855-1865.

Lindeberg, "Feature Detection with Automatic Scale Selection," International Journal of Computer Vision 30(2) (1998) 79-116.

Lowe, "Distinctive Image Features from Scale-Invariant Keypoints". International Journal of Computer Vision (2004) 1-28.

Mualla, Firas and Latakia, Syrien—"Automatic Unstained Cell Detection in Bright Field Microscopy" Abstract, https://www5.informatik.uni-erlangen.de/Forschung/Publikationen/2016/Mualla16-AUC.pdf, retrieved on Aug. 29, 2019, 156 pages.

Ober, et al. "Active Mixing of Complex Fluids at the Microscale", Proceedings of the National Academy of Sciences of the United States of America, Oct. 6, 2015: 112(40): 12293-12298, published online Sep. 22, 2015. doi: 10.1073/pnas.1509224112 https://www.ncbi.nlm.nih.gov/pmc/articles/PMC4603479/#eqs1.

Parker, "Water's impact on fountain beverages and beverage systems: Part 2," Water Tech Online, Oct. 1, 2003. (Year: 2003).

Uli, "Suicide Solution," Half Past Awesome, Aug. 6, 2009. (Year: 2009).

Verma, Abhishek and Liu, Chengjun—"SIFT Features in Multiple Color Spaces for Improved Image Classification", Springer International Publishing AG, Apr. 19, 2017, 22 pages.

Wu, Yen-Ju and Tsai, Chun-Ming—"Improving Leaf Classification Rate via Background Removal and ROI Extraction", Journal of Image and Graphics, vol. 4, No. 2, Dec. 2016, 6 pages.

* cited by examiner

LIQUID DISPENSING SYSTEM COMPRISING AN UNITARY DISPENSING NOZZLE

FIELD OF THE INVENTION

The present invention relates to liquid dispensing systems for dispensing two or more liquids into a container at high filling speeds to improve homogeneous mixing of such liquids.

BACKGROUND OF THE INVENTION

Liquid dispensing systems for simultaneously dispensing two or more liquids (e.g., a concentrate and a diluent) into a container are well known. Such liquid dispensing systems typically comprise so-called co-injection nozzles for concurrently but separately dispensing two or more liquids at high filling speeds.

When the liquids to be dispensed are significantly different in composition, viscosity, solubility, and/or miscibility, it is difficult to ensure homogeneous mixing of such liquids in the container. Further, it is inevitable that when dispensed into the container at relatively high filling speed, the liquids tend to splash, and one or more of the liquids may form hard-to-remove residues on the container wall, which may further exacerbate the issue of in-homogenous mixing. Still further, most of the co-injection nozzles commercially available today are not suitable for high-speed liquid filling, because they contain various moving parts (e.g., O-rings, seal gaskets, bolts, screws, etc.) that may become loose under high pressure, and they also may create dead spaces where liquids can be trapped, which may pose challenges for cleaning and result in poor sanitization. Further, when the liquids are dispensed at high filling speeds, it is difficult to ensure precision dosing of such liquids and 100% shut-off of the liquid flow when the dosing is completed.

Therefore, there is a need for liquid dispensing systems with co-injection nozzles that can accommodate high speed liquid filling, with improved homogeneity in the mixing results and reduced formation of residues on the container wall. There is also a need for liquid dispensing systems with improved precision dosing and complete shut-off.

SUMMARY OF THE INVENTION

The present invention meets the above-mentioned needs by providing a liquid dispensing system for dispensing two or more liquids into a container, comprising:

(A) a first liquid source for supplying a first liquid;

(B) a second liquid source for supplying a second liquid that is different from said first liquid in composition, viscosity, solubility, and/or miscibility;

(C) a unitary dispensing nozzle in fluid communication with said first and second liquid sources, said unitary dispensing nozzle is an integral piece free of any movable parts and comprises:

(a) a first end;

(b) a second, opposite end;

(c) one or more sidewalls between said first and second ends;

(d) one or more first flow passages for flowing the first liquid through said nozzle, wherein each of said first flow passages is defined by a first inlet and a first outlet; wherein said first inlet(s) is/are located at the first end of said nozzle; and wherein said first outlet(s) is/are located at the second end of said nozzle; and (e) one or more second flow passages for flowing the second liquid through said nozzle, wherein each of said second flow passages is defined by a second inlet and a second outlet; wherein said second inlet(s) is/are located on or near at least one of said sidewalls; wherein said second outlet(s) is/are located at the second end of said nozzle so that said one or more second flow passages extend through said at least one of the sidewalls and the second end of said nozzle; and wherein said second outlet(s) is/are substantially surrounded by said first outlet(s), (D) a first valve assembly located at or near the first end of said unitary dispensing nozzle for opening and closing said one or more first flow passages; and (E) a second valve assembly located at or near at least one of said sidewalls for opening and closing said one or more second flow passages.

Preferably, the first liquid source is controlled by a servo-driven pump, more preferably a servo-driven positive displacement pump, most preferably a servo-driven rotary positive displacement pump.

Preferably, the second liquid source is controlled by a servo-driven pump, more preferably a servo-driven piston pump, most preferably a servo-driven piston pump with a rotary valve.

These and other aspects of the present invention will become more apparent upon reading the following detailed description of the invention.

DETAILED DESCRIPTION OF THE INVENTION

Figure 1A:
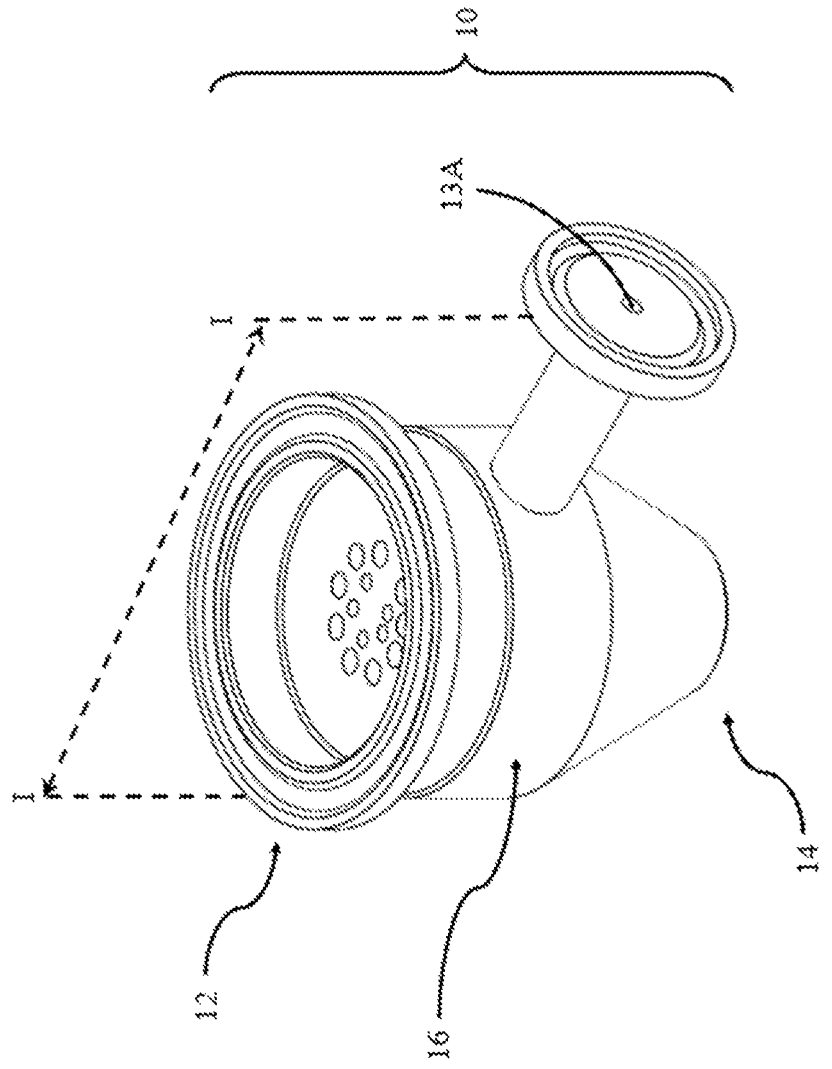
FIG. 1A is a perspective view of a unitary dispensing nozzle, according to one embodiment of the present invention.
Figure 1B:
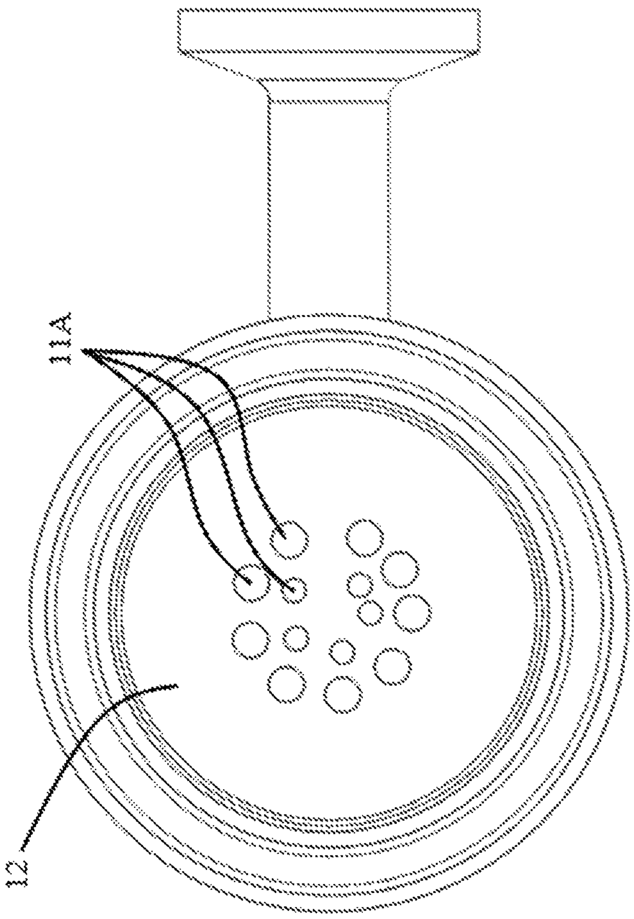
FIG. 1B is the top view of the unitary dispensing nozzle of FIG. 1A.

Features and benefits of the various embodiments of the present invention will become apparent from the following description, which includes examples of specific embodiments intended to give a broad representation of the invention. Various modifications will be apparent to those skilled in the art from this description and from practice of the invention. The scope of the present invention is not intended to be limited to the particular forms disclosed and the invention covers all modifications, equivalents, and alternatives falling within the spirit and scope of the invention as defined by the claims.

As used herein, articles such as "a" and "an" when used in a claim, are understood to mean one or more of what is claimed or described. The terms "comprise," "comprises," "comprising," "contain," "contains," "containing," "include," "includes" and "including" are all meant to be non-limiting.

As used herein, the terms "substantially free of" or "substantially free from" means that the indicated space is present in the volume of from 0% to about 1%, preferably from 0% to about 0.5%, more preferably from 0% to about 0.1%, by total volume of the unitary dispensing nozzle.

The unitary dispensing nozzle used in the present invention is made as an integral piece, without any moving parts (e.g., O-rings, sealing gaskets, bolts or screws). Such an integral structure renders it particularly suitable for high speed filling of viscous liquid, which typically requires high filling pressure. Such a unitary dispensing nozzle can be made by any suitable material with sufficient tensile strength, such as stainless steel, ceramic, polymer, and the like. Preferably, the unitary dispensing nozzle of the present invention is made of stainless steel.

The unitary dispensing nozzle of the present invention may have an average height ranging from about 3 mm to about 200 mm, preferably from about 10 to about 100 mm, more preferably from about 15 mm to about 50 mm. It may have an average cross-sectional diameter ranging from about 5 mm to about 100 mm, preferably from about 10 mm to about 50 mm, more preferably from about 15 mm to about 25 mm.

Such dispensing nozzle provides two or more fluid passages for simultaneously or substantially simultaneously dispensing two or more liquids of different composition, viscosity, solubility, and/or miscibility into a container. For example, one of the liquids can be a minor liquid feed composition, and the other can be a major liquid feed composition (i.e., the liquid making up the majority weight of the final liquid mixture). The container has an opening into which the two or more liquids are dispensed, while the total volume of the container may range from about 10 ml to about 10 L, preferably from about 20 ml to about 5 L, more preferably from about 50 ml to about 4 L.

FIGS. 1A-1F show a unitary dispensing nozzle, according to one embodiment of the present invention. Specifically, nozzle 10 has a first end 12 and a second, opposite end 14. Preferably but not necessarily, the first end 12 is on top, while the second, opposite end 14 is at the bottom. More preferably, the first and second ends 12 and 14 have relatively planar surfaces. One or more sidewalls 16 are located between the first and second ends 12 and 14. Such sidewalls can be either planar or cylindrical.

The nozzle 10 contains a plurality of first flow passages 11 for flowing a first fluid (e.g., a major liquid feed composition) therethrough. Each of the first flow passages 11 is defined by a first inlet 11A located at the first end 12 and a first outlet 11B located at the second end 14, as shown in FIG. 1E. Further, the nozzle 10 contains a second flow passage 13 for flowing a second fluid (e.g., a minor liquid feed composition) therethrough. The second flow passage 13 is defined by a second inlet 13A located near the sidewall 16 and a second outlet 13B located at the second end 14, so that the second flow passage 13 extends through the sidewall 16 and the second end 14, as shown in FIG. 1E.

The first and second outlets 11B and 13B can have any suitable shapes, e.g., circular, semicircular, oval, square, rectangular, crescent, and combinations thereof. Preferably but not necessarily, both the first and second outlets 11B and 13B are circular, as shown in FIG. 1C.

Figure 1C:
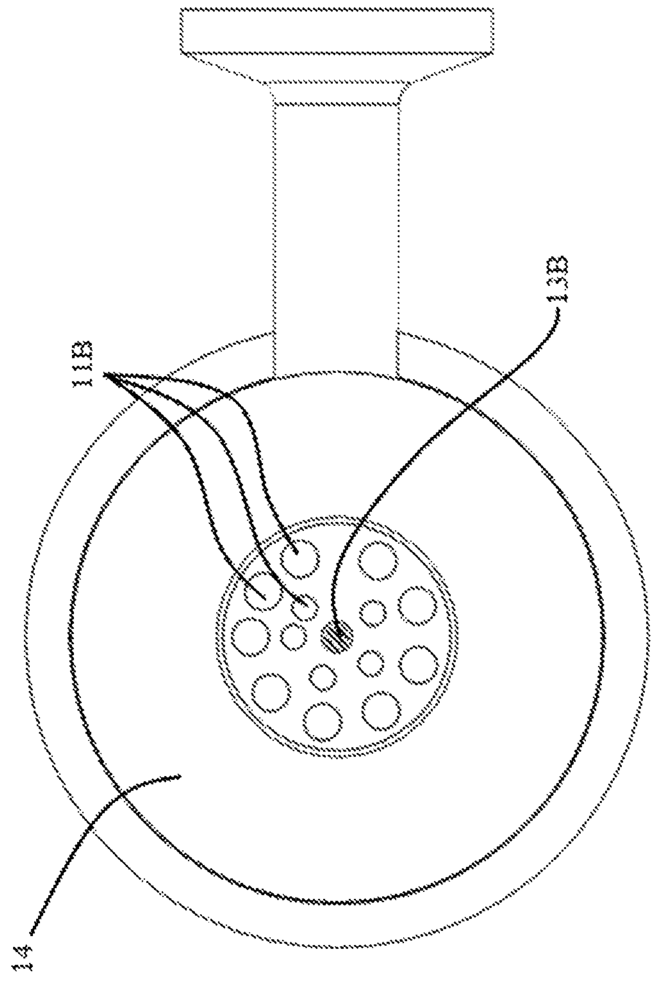
FIG. 1C is the bottom view of the unitary dispensing nozzle of FIG. 1A.
Figure 1D:
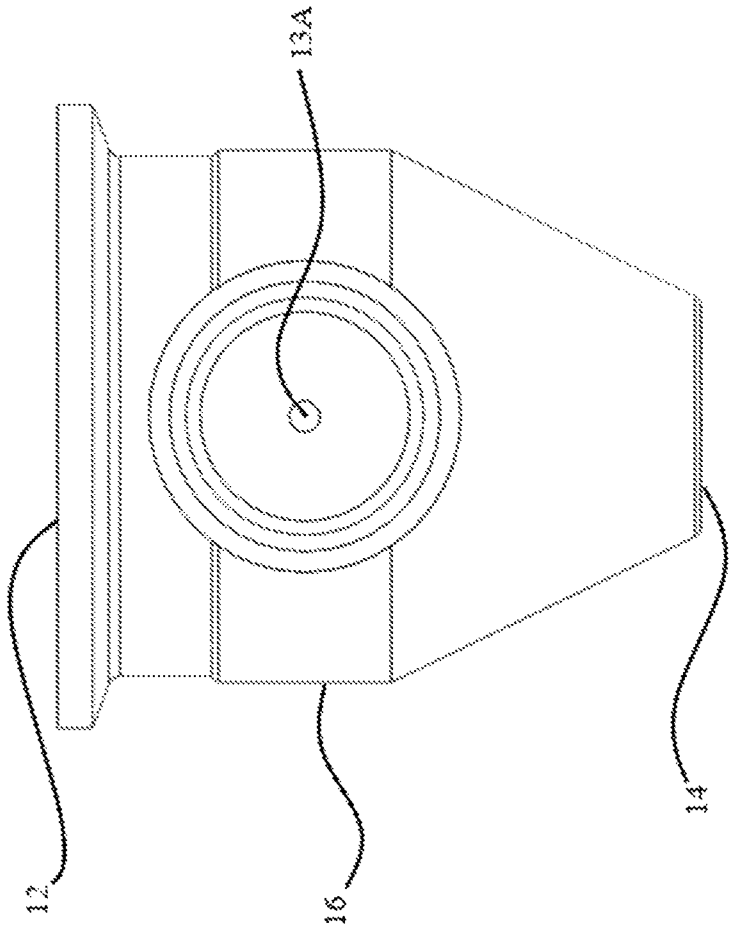
FIG. 1D is a side view of the unitary dispensing nozzle of FIG. 1A.
Figure 1E:
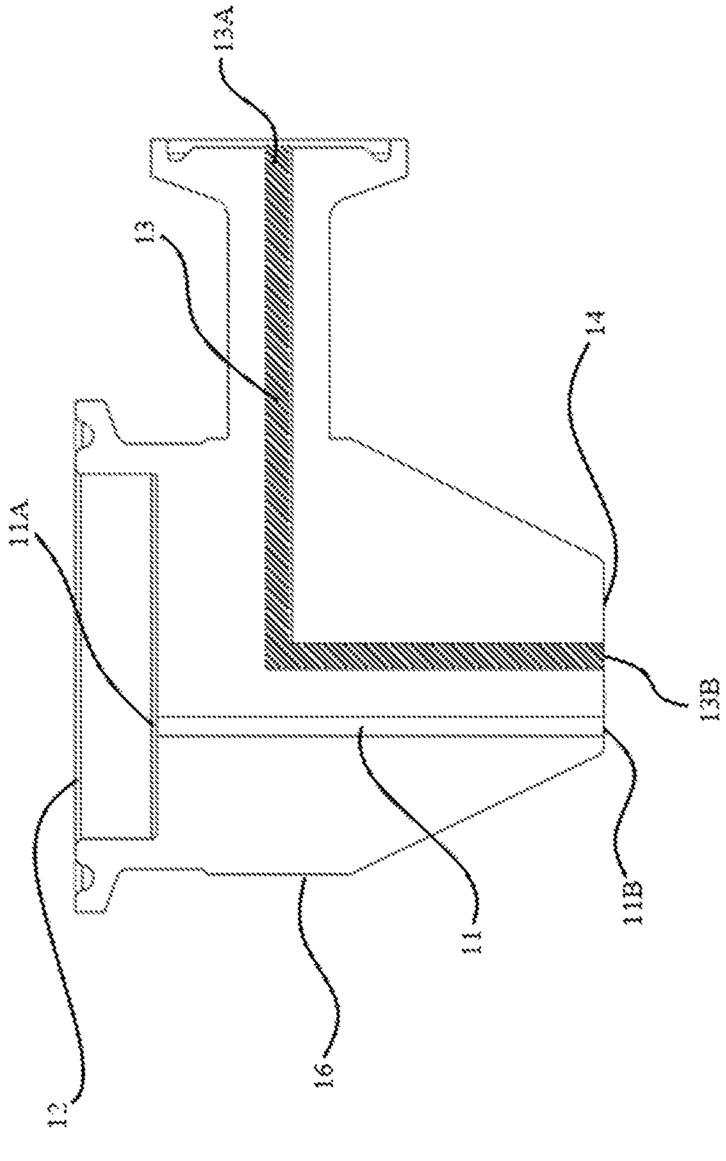
FIG. 1E is a cross-sectional view of the unitary dispensing nozzle of FIG. 1A along plane I-I.
Figure 1F:
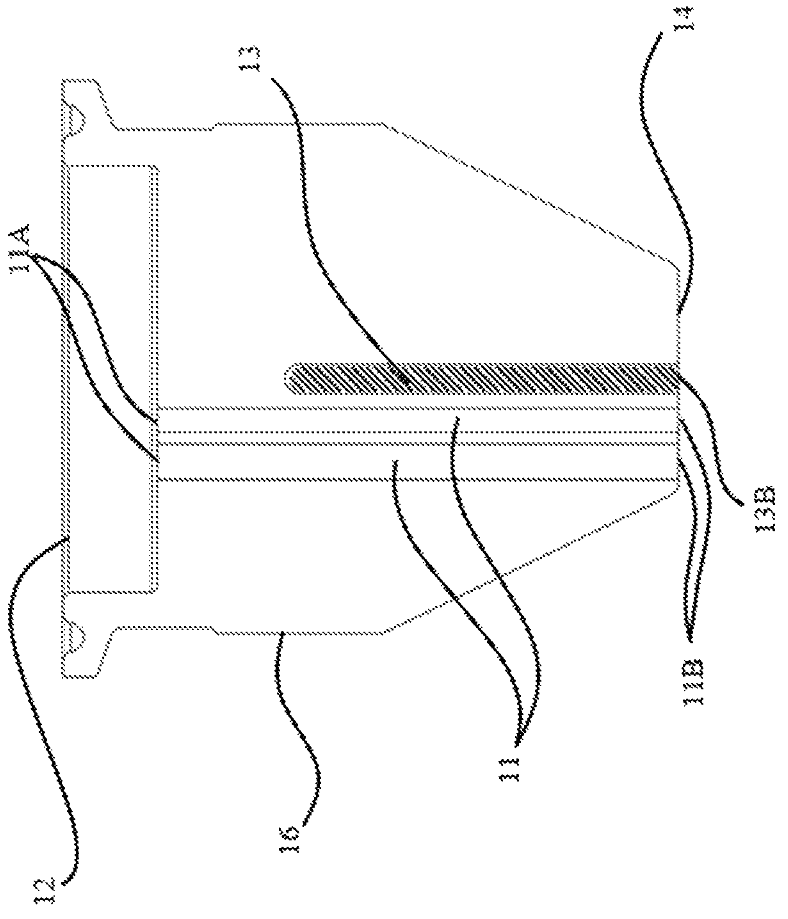
FIG. 1F is a cross-sectional view of the unitary dispensing nozzle of FIG. 1A along a plane that is perpendicular to I-I.

Further, the second outlet 13B is substantially surrounded by the plurality of first outlets 11B, as shown in FIG. 1C. In the event that the minor liquid feed composition is prone to form hard-to-remove residues once it is deposited on the container wall, such an arrangement is particularly effective for preventing the minor liquid feed composition from depositing on the container wall, because the minor feed flow existing the second outlet 13B will be substantially surrounded by a plurality of major feed flows existing the first outlets 11B, which form a "liquid shroud" around the minor feed flow and thereby reducing formation of hard-to-remove residues by the minor feed on the container wall.

The plurality of major feed flows can be configurated to form a diverging "liquid shroud" around the minor feed flow. Alternatively, the plurality of major feed flows may be substantially parallel to each other, thereby forming a parallel "liquid shroud" around the minor feed flow. Such a parallel arrangement of the major feed flows is particularly preferred in the present invention because it provides a greater local turbulence around the minor feed flow inside the container and enables a better, more homogenous mixing result.

Still further, the nozzle 10 is substantially free of any dead space (i.e., spaces that are not directly in the flow passages and therefore can trap liquid residues). Therefore, it is easy to clean and is less likely to cause cross-contamination when switching between different liquid feeds.

Preferably, but not necessarily, the ratio of the total cross-sectional area of the first outlets 11B over the total cross-sectional area of the second outlet 13B may range from about 5:1 to about 50:1, preferably from about 10:1 to about 40:1, and more preferably from about 15:1 to about 35:1. Such ratio ensures a significantly large major-to-minor flow rate ratio, which in turn enables more efficient dilution of the minor ingredient in the container, ensuring that there is no 'hot spots' of localized high concentrations of minor ingredient in the container.

FIGS. 2A-2E show a unitary dispensing nozzle, according to another embodiment of the present invention. Specifically, nozzle 20 has a first end 22 and a second, opposite end 24. Both the first and second ends 22 and 24 have relatively planar surfaces. A cylindrical sidewall 26 is located between the first and second ends 22 and 24.

Figure 2A:
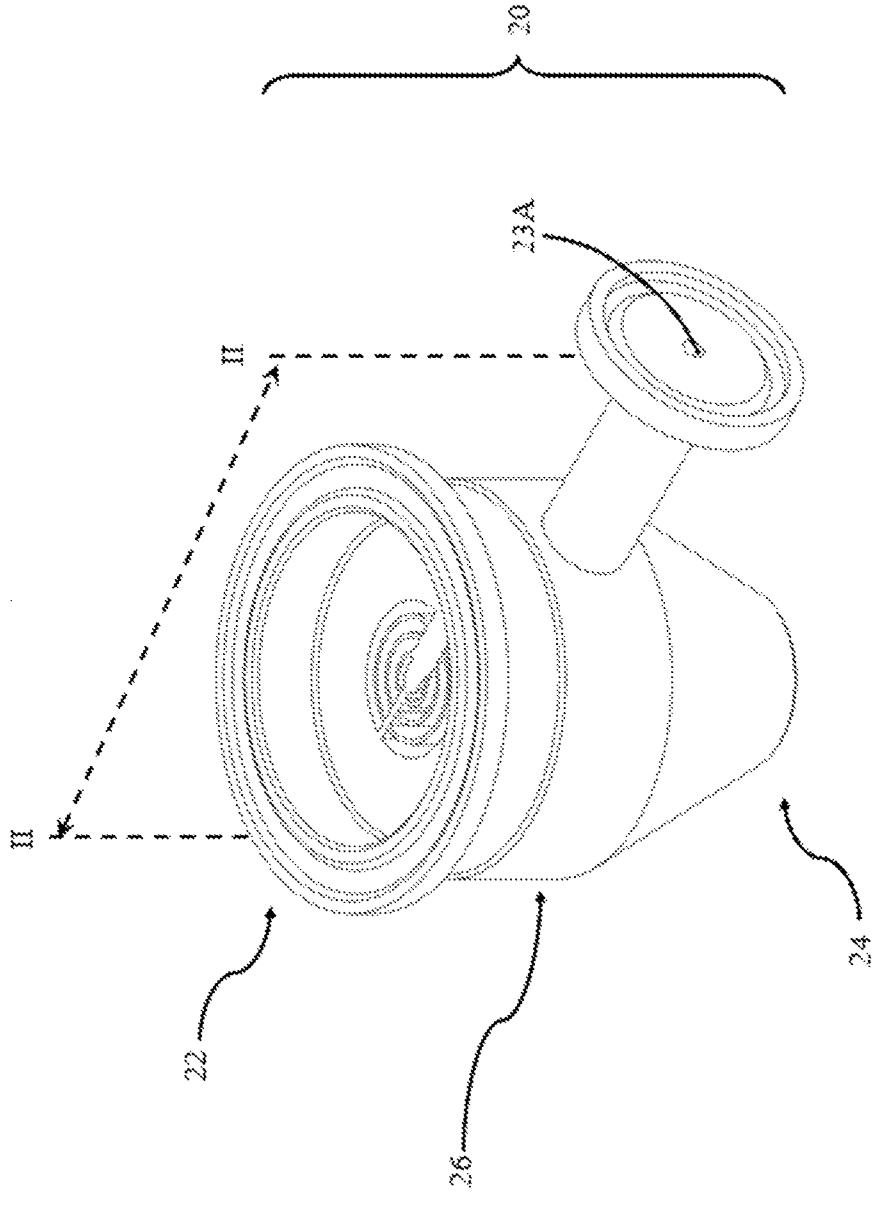
FIG. 2A is a perspective view of a unitary dispensing nozzle, according to another embodiment of the present invention.
Figure 2B:
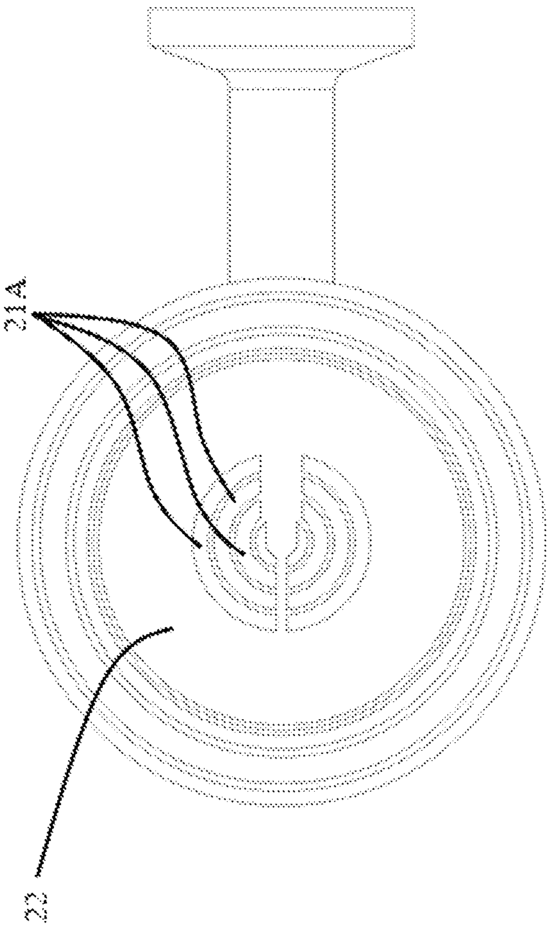
FIG. 2B is the top view of the unitary dispensing nozzle of FIG. 2A.
Figure 2C:
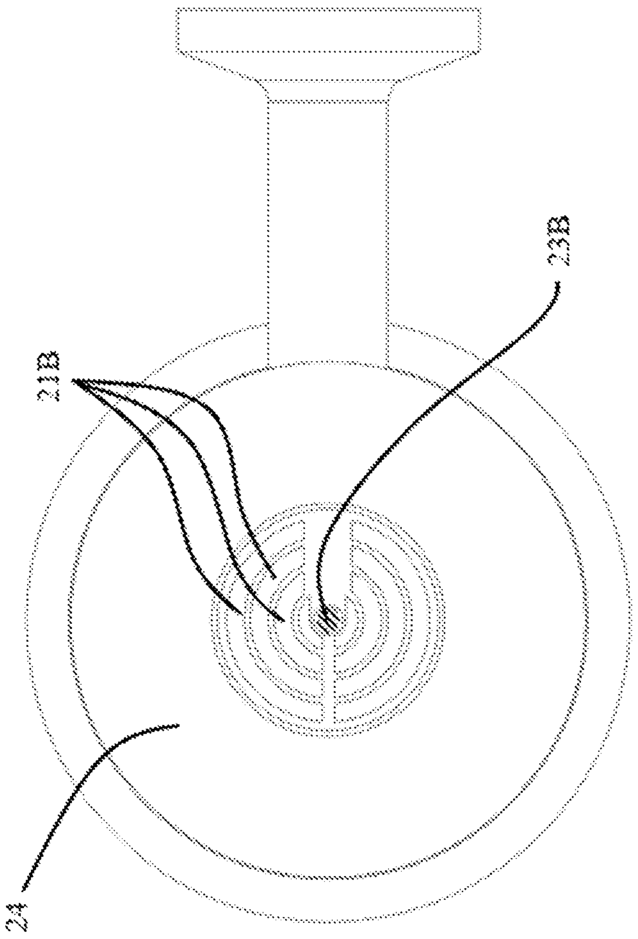
FIG. 2C is the bottom view of the unitary dispensing nozzle of FIG. 2A.
Figure 2D:
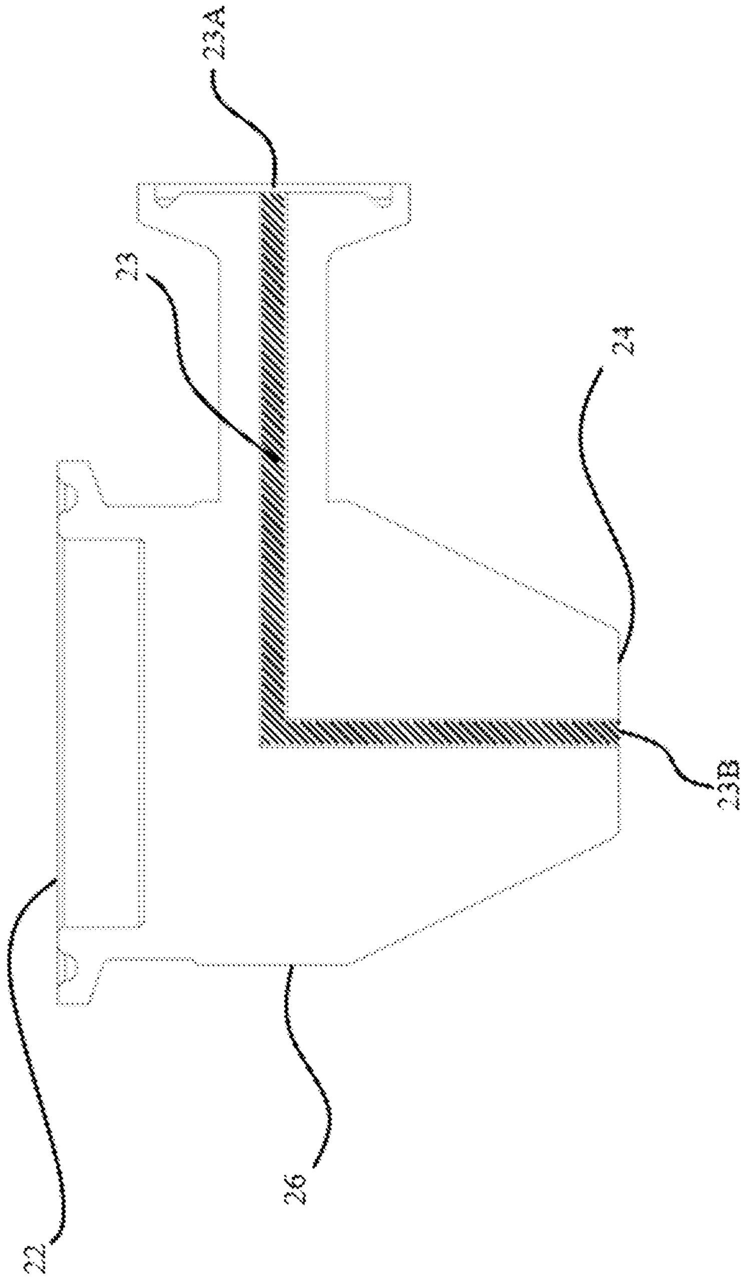
FIG. 2D is a cross-sectional view of the unitary dispensing nozzle of FIG. 2A along plane II-II.
Figure 2E:
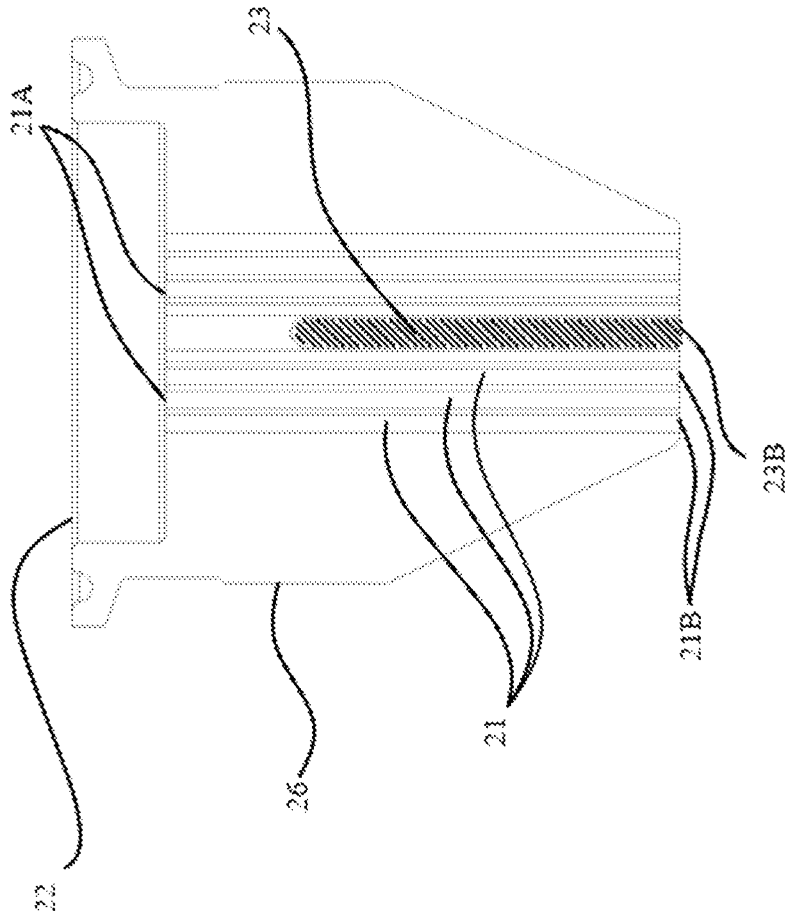
FIG. 2E is a cross-sectional view of the unitary dispensing nozzle of FIG. 1A along a plane that is perpendicular to II-II.

The nozzle 20 contains a plurality of first flow passages 21 for flowing a first fluid (e.g., a major liquid feed composition) therethrough. Each of the first flow passages 21 is defined by a first inlet 21A located at the first end 22 and a first outlet 21B located at the second end 24, as shown in FIGS. 2B, 2C and 2E. Further, the nozzle 20 contains a second flow passage 23 for flowing a second fluid (e.g., a minor liquid feed composition) therethrough. The second flow passage 23 is defined by a second inlet 23A located near the cylindrical sidewall 26 and a second outlet 23B located at the second end 24, so that the second flow passage 23 extends through the cylindrical sidewall 26 and the second end 24, as shown in FIGS. 2C and 2D.

All of the first outlets 21B have a crescent shape, while such crescents are arranged in a concentric manner with substantially the same radius center. In contrast, the second outlet 23B is circular in shape. Further, the second outlet 23B is located at the radius center of the first outlets 21B and is substantially surrounded by the plurality of first outlets 21B, as shown in FIG. 2C. In the event that the minor liquid feed composition is prone to form hard-to-remove residues once it is deposited on the container wall, such an arrangement is particularly effective for preventing the minor liquid feed composition from depositing on the container wall, because the minor feed flow existing the second outlet 23B will be substantially surrounded by the plurality of major feed flows existing the first outlets 21B, which form a "liquid shroud" around the minor feed flow and thereby reducing formation of hard-to-remove residues by the minor feed on the container wall.

The nozzle 20 is also substantially free of any dead space and is therefore easy to clean with a reduced risk of cross-contamination when changing liquid feeds.

Preferably, but not necessarily, the ratio of the total cross-sectional area of the first outlets 21B over the total cross-sectional area of the second outlet 23B may range from about 5:1 to about 50:1, preferably from about 10:1 to about 40:1, and more preferably from about 15:1 to about 35:1.

FIGS. 3A-3D show a unitary dispensing nozzle, according to yet another embodiment of the present invention. Specifically, nozzle 30 has a first end 32 and a second, opposite end 34. Both the first and second ends 32 and 34 have relatively planar surfaces. A cylindrical sidewall 36 is located between the first and second ends 32 and 34.

Figure 3A:
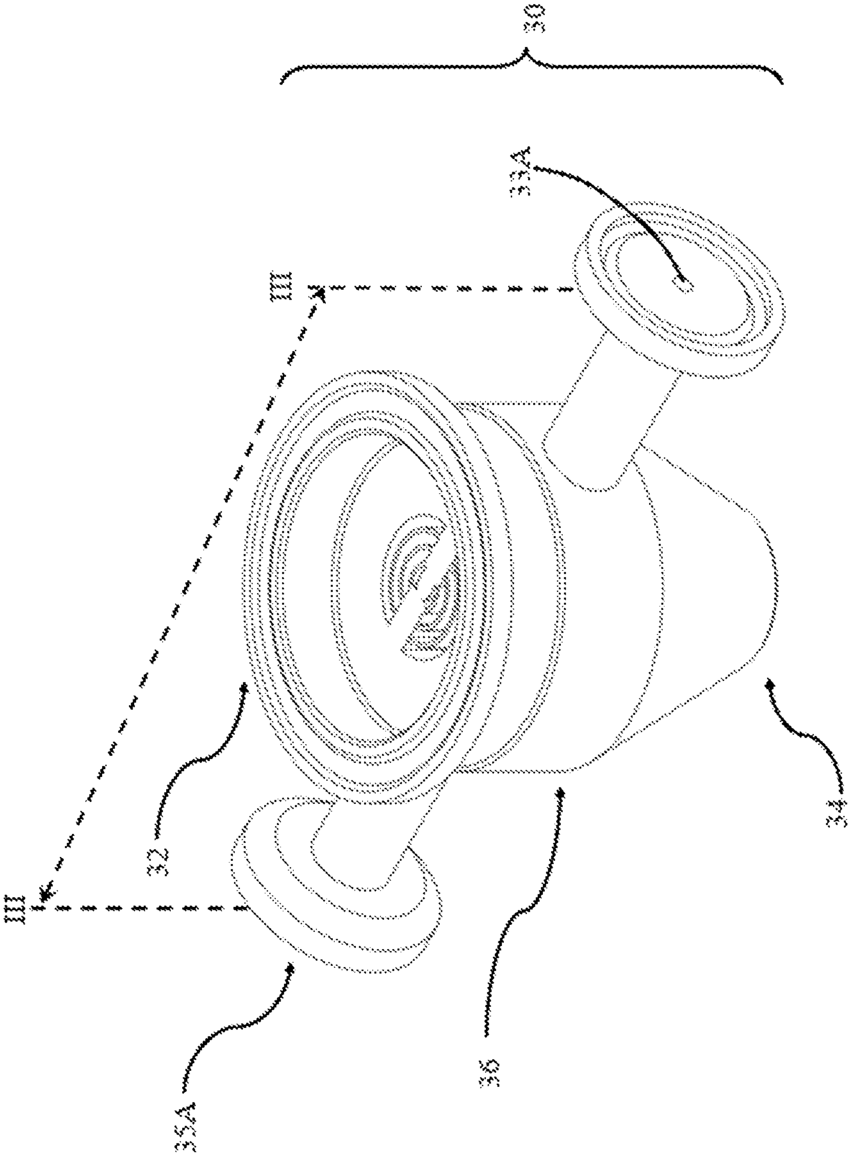
FIG. 3A is a perspective view of a unitary dispensing nozzle, according to yet another embodiment of the present invention.
Figure 3B:
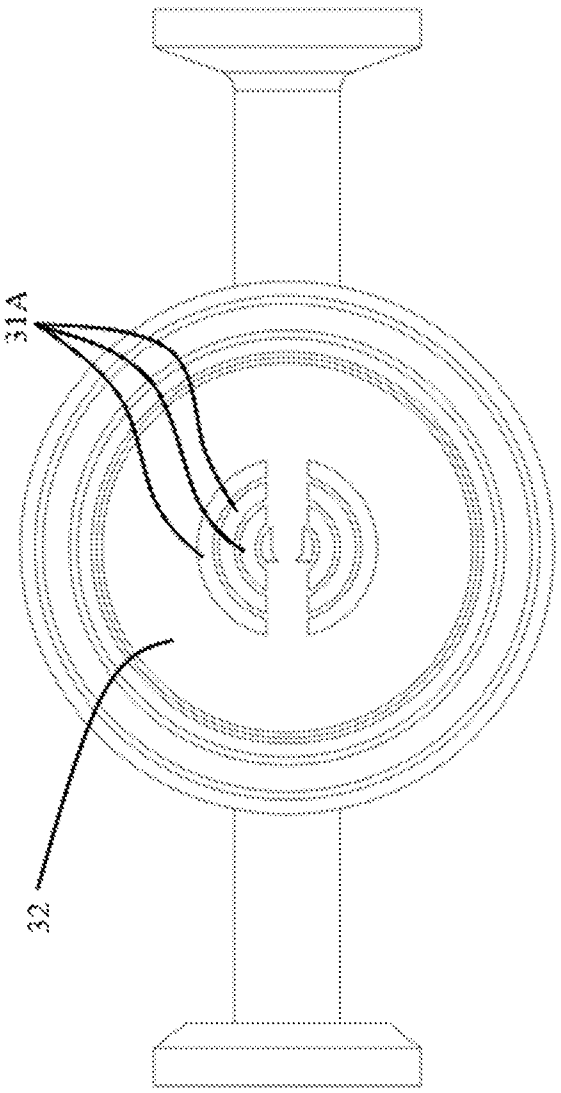
FIG. 3B is the top view of the unitary dispensing nozzle of FIG. 3A.
Figure 3C:
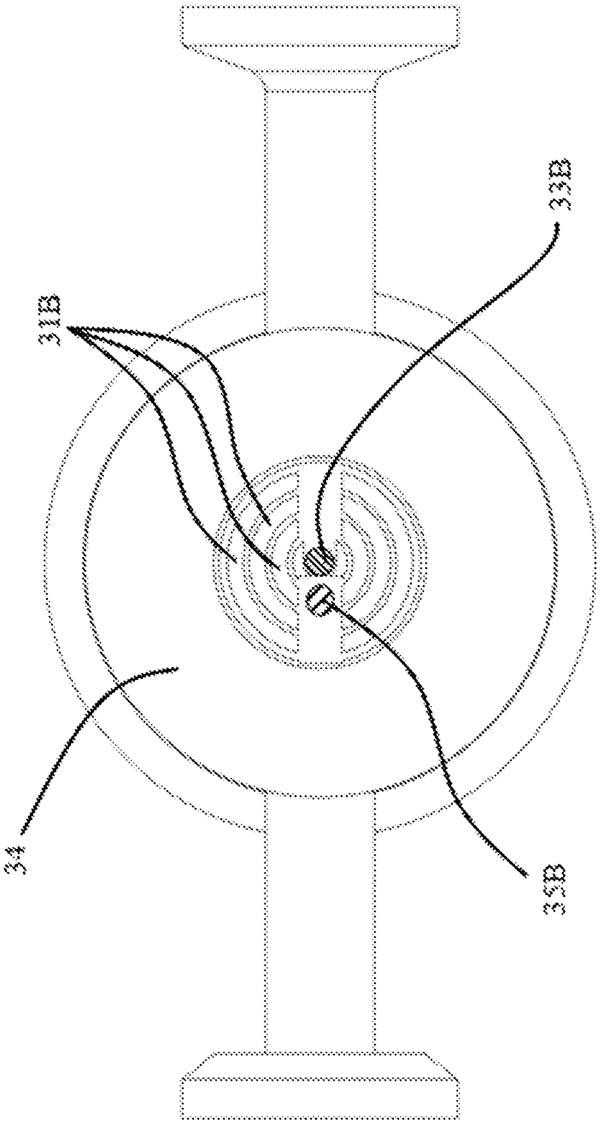
FIG. 3C is the bottom view of the unitary dispensing nozzle of FIG. 3A.
Figure 3D:
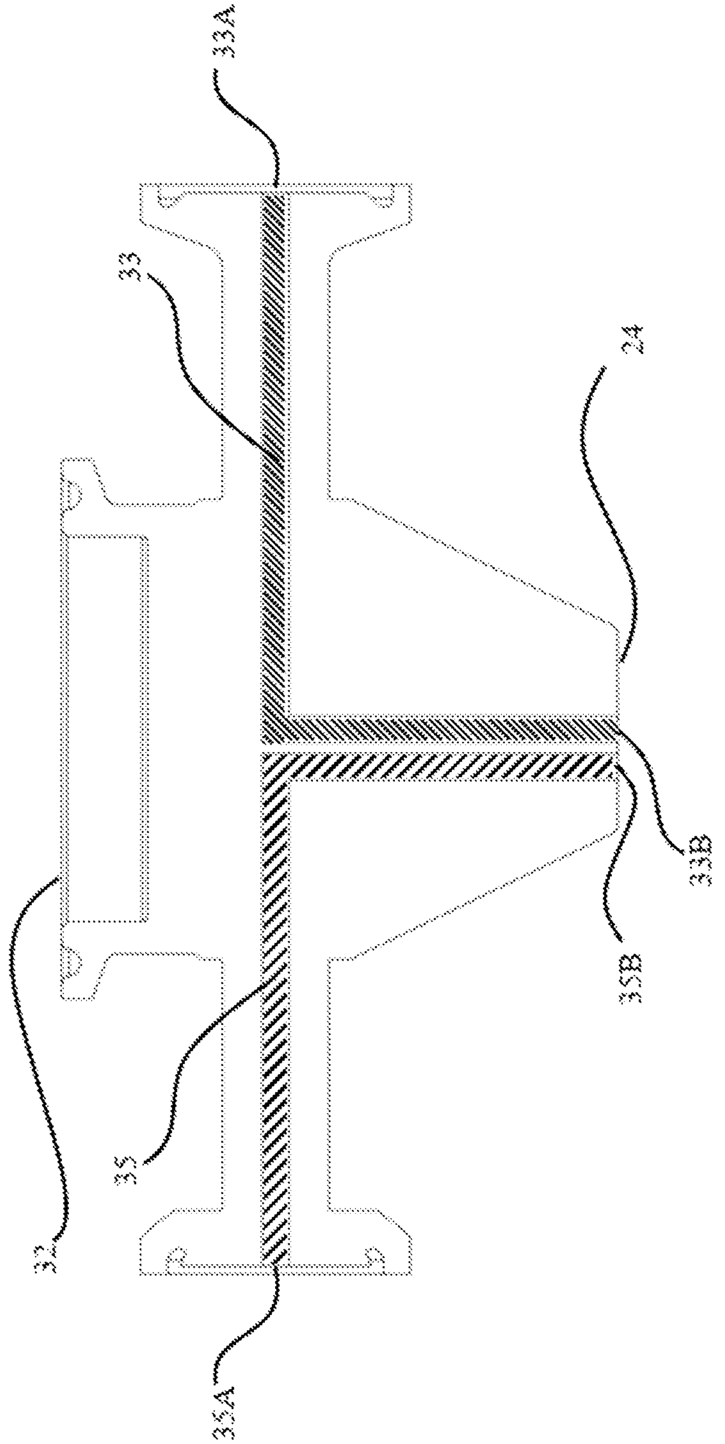
FIG. 3D is a cross-sectional view of the unitary dispensing nozzle of FIG. 3A along plane III-III.
Figure 3E:
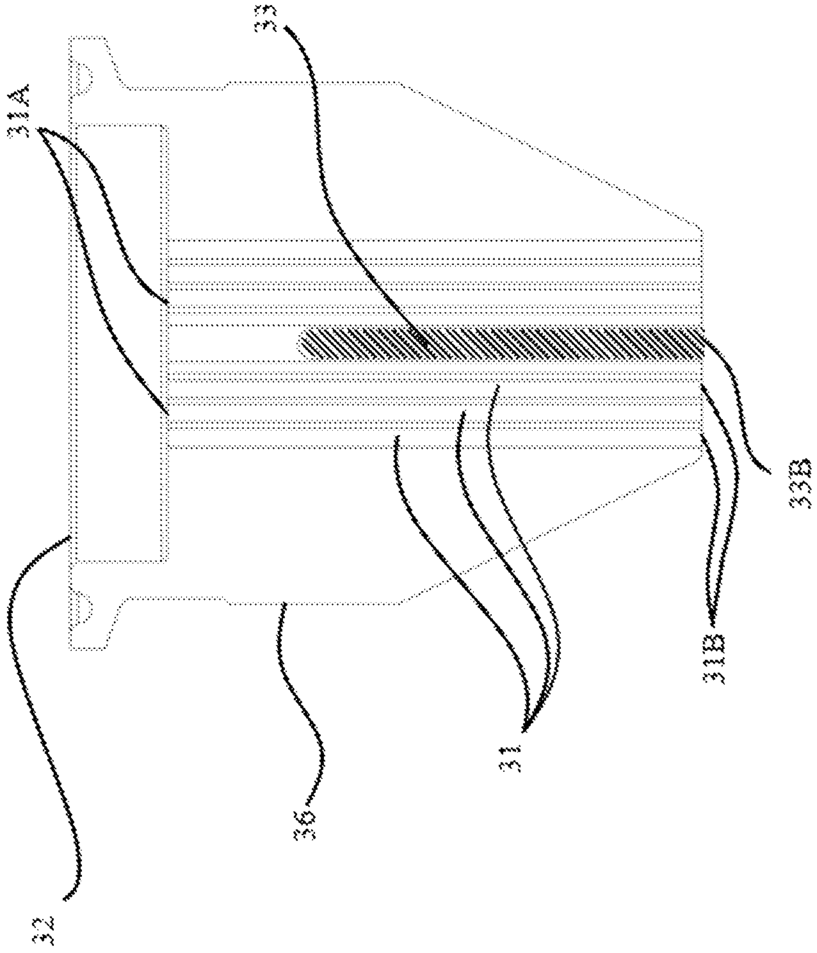
FIG. 3E is a cross-sectional view of the unitary dispensing nozzle of FIG. 1A along a plane that is perpendicular to III-III.

The nozzle 30 contains a plurality of first flow passages 31 for flowing a first fluid (e.g., a major liquid feed composition) therethrough. Each of the first flow passages 31 is defined by a first inlet 31A located at the first end 32 and a first outlet 31B located at the second end 34, as shown in FIGS. 3B, 3C and 3E. Further, the nozzle 30 contains a second flow passage 33 for flowing a second fluid (e.g., a minor liquid feed composition) therethrough. The second flow passage 33 is defined by a second inlet 33A located near one side of the cylindrical sidewall 36 and a second outlet 33B located at the second end 34, so that the second flow passage 33 extends through the cylindrical sidewall 36 and the second end 34, as shown in FIGS. 3C and 3D. Still further, the nozzle 30 contains a third flow passage 35 for flowing a third fluid (e.g., an additional minor liquid feed composition) therethrough. The third flow passage 35 is defined by a third inlet 35A located near the other side of the cylindrical wall 36 and a third outlet 35B located at the second end 34, so that the third flow passage 35 extends through the cylindrical sidewall 36 (at an side opposite to the second flow passage 33) and the second end 34, as shown in FIGS. 3A, 3C and 3D.

All of the first outlets 31B have a crescent shape, while such crescents are arranged in a concentric manner with substantially the same radius center. In contrast, the second outlet 33B and the third outlet 35B are circular in shape. Further, the second outlet 33B is located at the radius center of the first outlets 31B, while the third outlet 35B is located adjacent to the radius center of the first outlets 31B. In this manner, both the second and third outlets 33B and 35B are substantially surrounded by the plurality of first outlets 31B, as shown in FIG. 3C. In the event that either or both of the minor liquid feed compositions are prone to form hard-to-remove residues once deposited on the container wall, such an arrangement functions to minimize the deposition of minor liquid feed compositions onto the container wall, because the minor feed flows existing the second outlet 33B and the third outlet 35B will be substantially surrounded by the plurality of major feed flows existing the first outlets 31B, which form a "liquid shroud" around the minor feed flows and thereby reducing formation of hard-to-remove residues by the minor feeds on the container wall.

The nozzle 30 is also substantially free of any dead space and is therefore easy to clean with a reduced risk of cross-contamination when changing liquid feeds.

Preferably, but not necessarily, the ratio of the total cross-sectional area of the first outlets 31B over the total cross-sectional area of the second outlet 33B may range from about 5:1 to about 50:1, preferably from about 10:1 to about 40:1, and more preferably from about 15:1 to about 35:1. Similarly, the ratio of the total cross-sectional area of the first outlets 31B over the total cross-sectional area of the third outlet 35B may range from about 5:1 to about 50:1, preferably from about 10:1 to about 40:1, and more preferably from about 15:1 to about 35:1.

Figure 4:
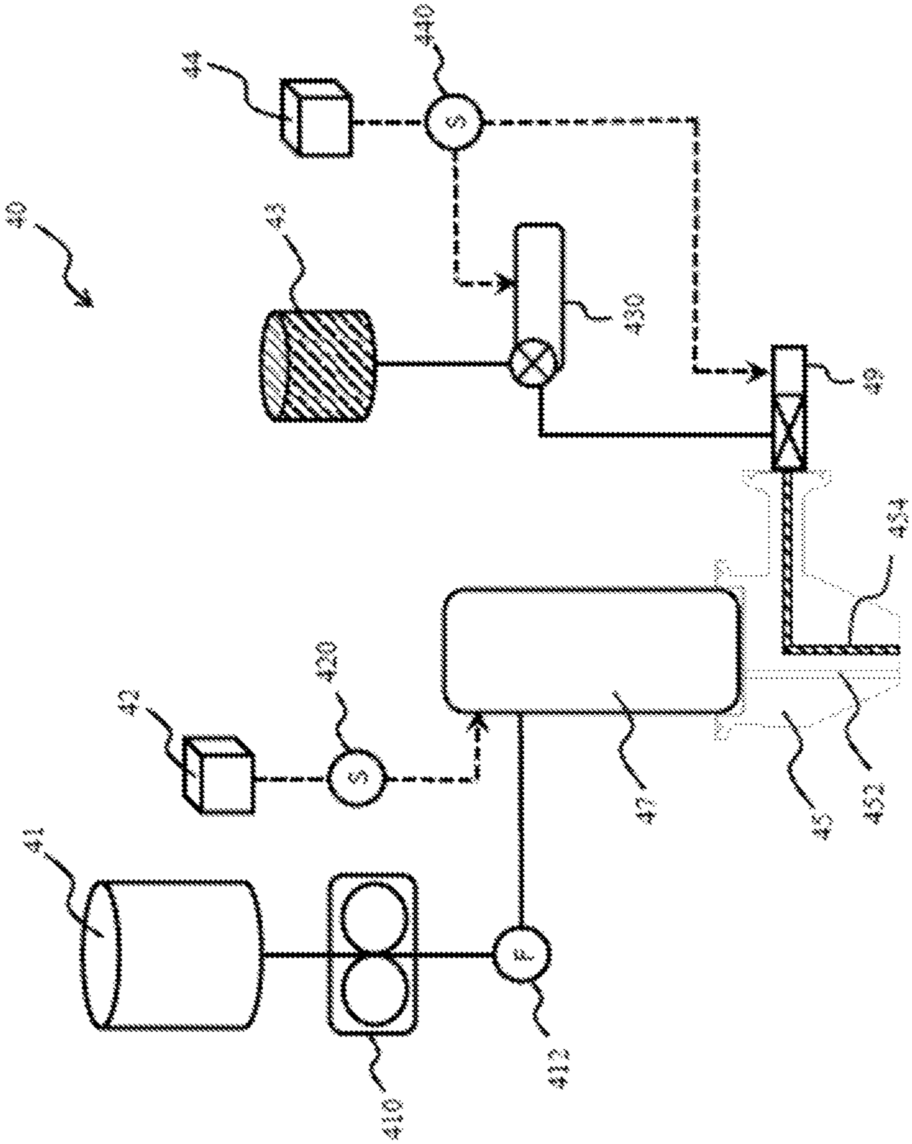
FIG. 4 is a schematic view of a liquid dispensing system, according to one embodiment of the present invention.

FIG. 4 is a schematic view of a liquid dispensing system 40 according to one embodiment of the present invention. Specifically, such liquid dispensing system 40 comprises: (A) a first liquid source 41 for supplying a first liquid (not shown); (B) a second liquid source 43 for supplying a second liquid (not shown); (C) a unitary dispensing nozzle 45 as described hereinabove, which is in fluid communication with the first and second liquid sources 41 and 43; (D) a first valve assembly 47 located at or near a first end of the unitary dispensing nozzle 45 for opening and closing one or more first flow passages 452 of the first liquid; and (E) a second valve assembly 49 located at or near at least one of sidewalls of the unitary dispensing nozzle 45 for opening and closing one or more second flow passages 454 of the second liquid.

The first liquid is preferably stored in a storage tank under atmospheric pressure. To ensure sufficient mixing of liquids in the container, it is necessary that the first liquid, i.e., the major feed liquid composition, is filled by the unitary dispensing nozzle 45 at a significantly high speed so as to generate a sufficiently strong influx and turbulence in the container. Preferably, the major feed liquid composition is filled at an average flow rate ranging from about 50 ml/second to about 10 L/second, preferably from about 100 ml/second to about 5 L/second, more preferably from about 500 ml/second to about 1.5 L/second. To achieve such a high filling speed of the major feed liquid composition while maintaining dosing precision, it is preferred that the first liquid source 41 is controlled by a servo-driven pump 410. The servo-driven pump 410 is preferably a servo-driven positive displacement pump, more preferably a servo-driven rotary positive displacement pump, such as the Universal II series Model 018 rotary PD pumps commercially available from Waukesha Cherry-Burrell (Wisconsin, USA). The first fluid supplied by the first liquid source 41 may flow through a flowmeter 412, which measures the mass or volumetric flow rate of the first fluid to further ensure precision dosing thereof.

The first valve assembly 47 located at or near the first end of the unitary dispensing nozzle 45 is preferably actuated by a first remotely mounted pneumatic solenoid 420, which in turn is in fluid communication with a pressurized air supply 42. Pressurized air is passed from the air supply 42 through the pneumatic solenoid 420 into said first valve assembly 47 to open and close the one or more first flow passages 452, thereby controlling the flow of the first liquid through the unitary dispensing nozzle 45.

The second fluid supplied by the second fluid source 43 to the unitary dispensing nozzle 45 is preferably a minor liquid feed composition, and more preferably a liquid with significantly higher viscosity than the major liquid feed composition, which can be filled at an average flow rate ranging from 0.1 ml/second to about 1000 ml/second, preferably from about 0.5 ml/second to about 800 ml/second, more preferably from about 1 ml/second to about 500 ml/second.

The second liquid source 43 preferably comprises a pressurized header (not shown) for supplying the second liquid at an elevated pressure (i.e., higher than atmospheric pressure). The second liquid supply 43 is preferably controlled by a servo-driven pump 430, which is preferably a servo-driven piston pump, more preferably a servo-driven piston pump with a rotary valve. Most preferred servo-driven pump for controlling the second liquid supply 43 is the Hibar 4S series precision rotatory dispensing pump commercially available from Hibar Systems Limited (Ontario, Canada), which comprises a ceramic 3-way rotary valve that is particularly suitable for handling high viscosity liquids. The servo-driven piston pump 430 is preferably actuated by a second remotely mounted pneumatic solenoid 440, which passes pressurized air from an air source 44 into the rotary valve of the pump 430 to rotate said valve between a dosing mode and a dispensing mode. In said dosing mode, a predetermined amount of said second liquid is dosed by said second liquid source 43 into said servo-driven piston pump 430; and in said dispensing mode, said predetermined amount of the second liquid is dispensed by said servo-driven piston pump 430 to said unitary dispensing nozzle 45.

The second valve assembly 49 located at or near at lease one of the sidewalls of the unitary dispensing nozzle 45 preferably comprises an air-operated valve for opening and closing said one or more second flow passages 454 of the unitary dispensing nozzle 45. The air-operated valve is preferably a pinch valve that opens by flexing an internal membrane (not shown) to allow fluid to flow through, and it is particularly suitable for isolating the fluid from any internal valve parts and ensuring 100% shut-off. Preferably, the air-operated valve is actuated by a remotely mounted pneumatic solenoid. More preferably, the air-operated valve is actuated also by the second remotely mounted pneumatic solenoid 440.

Figure 5:
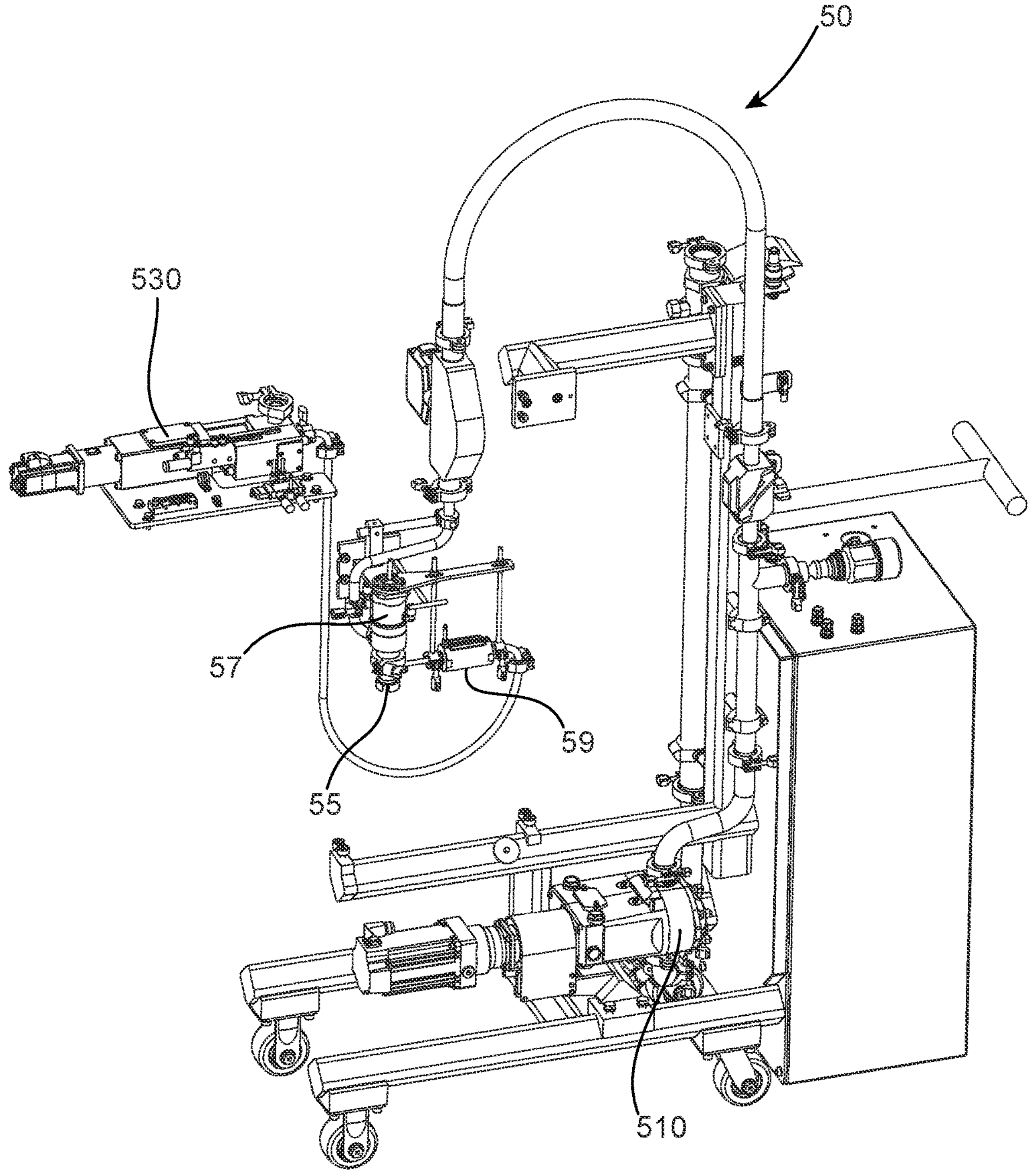
FIG. 5 is a perspective view of parts of a liquid dispensing system, according to one embodiment of the present invention.

FIG. 5 is a perspective view of parts of a liquid dispensing system 50, according to one embodiment of the present invention. Specifically, a first liquid source (not shown) controlled by a servo-driven rotary positive displacement pump 510, which is preferably a Universal II series Model 018 rotary PD pump commercially available from Waukesha Cherry-Burrell (Wisconsin, USA), supplies a low viscosity major feed liquid (not shown) to a unitary dispensing nozzle 55 through a first valve assembly 57. A second liquid source (not shown) controlled by a servo-driven piston pump 530, which is preferably a Hibar 4S series precision rotatory dispensing pump commercially available from Hibar Systems Limited (Ontario, Canada) with a ceramic 3-way rotary valve, supplies a high viscosity minor feed liquid (not shown) to the unitary nozzle 55 through a second valve assembly 59.

Figure 6:
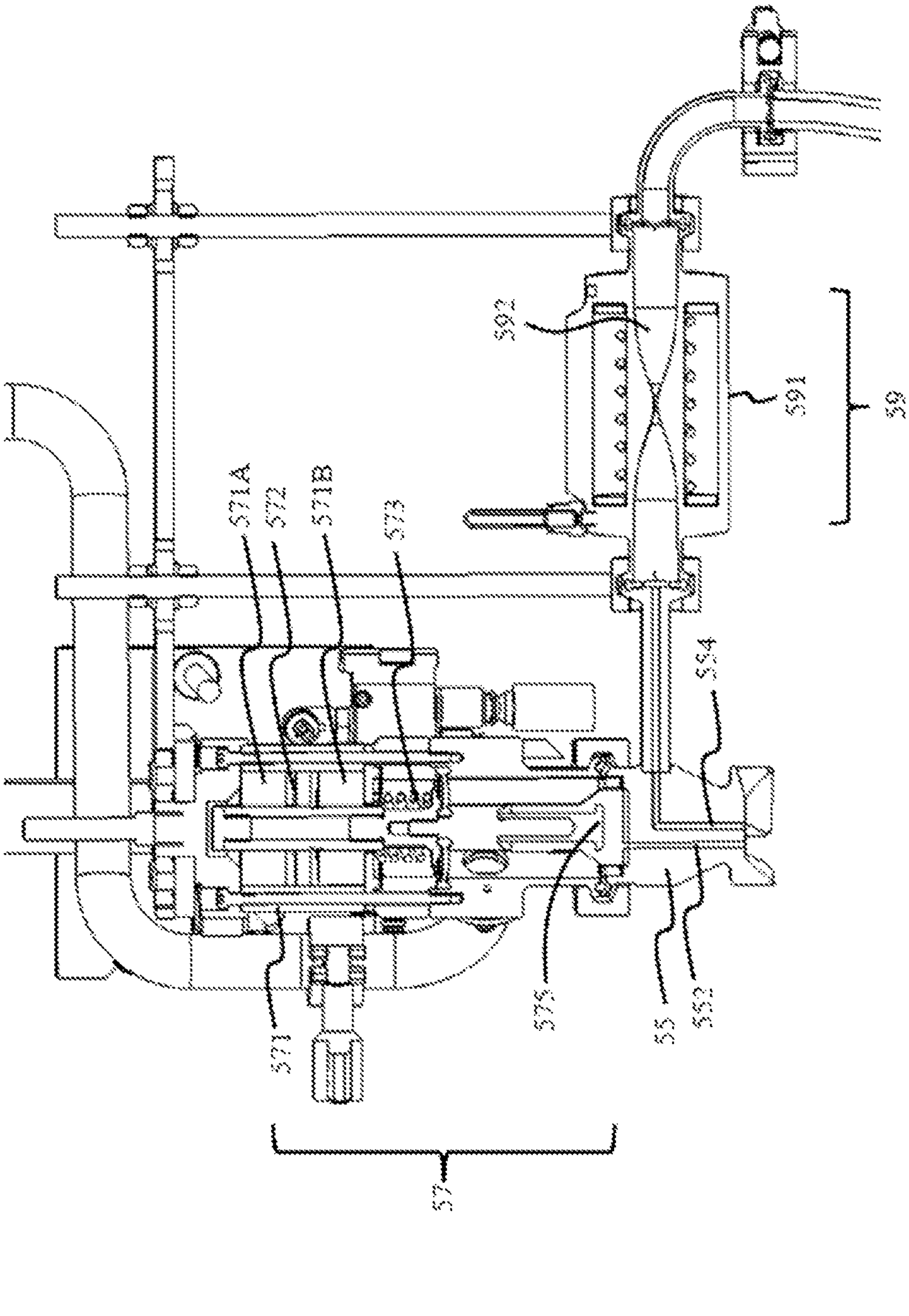
FIG. 6 is a cross-sectional view of a unitary dispensing nozzle, a first valve assembly and a second valve assembly from FIG. 5.

FIG. 6 is a cross-sectional view of the unitary dispensing nozzle 55, the first valve assembly 57, and the second valve assembly 59 from FIG. 5. The unitary dispensing nozzle 55 comprises one or more first flow passages 552, which extend from a first end to a second end of said unitary dispensing nozzle 55 to allow the low viscosity major feed liquid (not shown) to flow therethrough. The unitary dispensing nozzle 55 further comprises one or more second flow passages 554, which extend from a side wall of the nozzle 55 to the second end thereof to allow the high viscosity minor feed liquid (not shown) to flow therethrough.

The first valve assembly 57 located at or near the first end of the unitary dispensing nozzle 55 preferably comprises an air cylinder 571 with an internal piston 572 that divides such air cylinder 571 into an upper chamber 571A and a lower chamber 571B, a spring 573, and a fluid plunger 575. The internal piston 572 is capable of moving up and down along the air cylinder 571 when pressurized air is passed into the lower or upper chamber 571A or 571B of said air cylinder 571. The fluid plunger 575 is connected with and actuated by said internal piston 572 and said spring 573.

Typically, the fluid plunger 575 is being pushed down by the spring to seat immediately above the one or more first flow passages 552. When the fluid plunger 575 is in this position, it blocks off the one or more first flow passages 552, thereby preventing the low viscosity major feed liquid from flowing through said one or more first flow passages 552.

To open the one or more first flow passages 552, a first remotely mounted pneumatic solenoid (not shown) is triggered to pass pressurized air from an air supply (not shown) into the bottom chamber 571B of the air cylinder 571 to pressurize said bottom chamber 571B. When this occurs, the internal piston 572 raises up along the air cylinder 571. Because the internal piston 572 is directly coupled to the fluid plunger 575, the upward motion of the internal piston 572 moves the fluid plunger 575 up against the closing force of the spring 573. When the fluid plunger 575 is moved up and away from the one or more first flow passages 552 (as shown in FIG. 6), the low viscosity major feed fluid is permitted to flow through said one or more first flow passages 552 of the unitary dispensing nozzle 55.

To again close the one or more first flow passages 552, the first remotely mounted pneumatic solenoid (not shown) is triggered to vent air out of the bottom chamber 571B of the air cylinder 571 while passing pressurized air from the air supply (not shown) into the upper chamber 571A of the air cylinder 571. When this occurs, the internal piston 572 drops down along the air cylinder 571 at the combined forces of the pressurized upper chamber 571A and the spring 573, which in turn pushes the fluid plunger 575 down to seat above the one or more first flow passages 552. Correspondingly, the one or more first flow passages 552 are sealed off, and the flow of the major feed fluid therethrough is stopped.

The second valve assembly 59 located at or near a side wall of the unitary dispensing nozzle 55 preferably comprises an air-operated pinch valve 591 having an internal membrane 592. When the pinch valve 591 is filled with pressurized air, the internal membrane 592 closes and cuts off flow of the high viscosity minor feed liquid into the one or more second flow passages 554. When the pressurized air is let out of the pinch valve 591, the internal member 592 flexes to open under the force of the liquid flow, thereby allowing the high viscosity minor feed liquid to flow therethrough into the one or more second flow passages 554. Preferably, flow of pressurized air in and out of the pinch valve 591 is controlled by a remotely mounted pneumatic solenoid.

Figure 7:
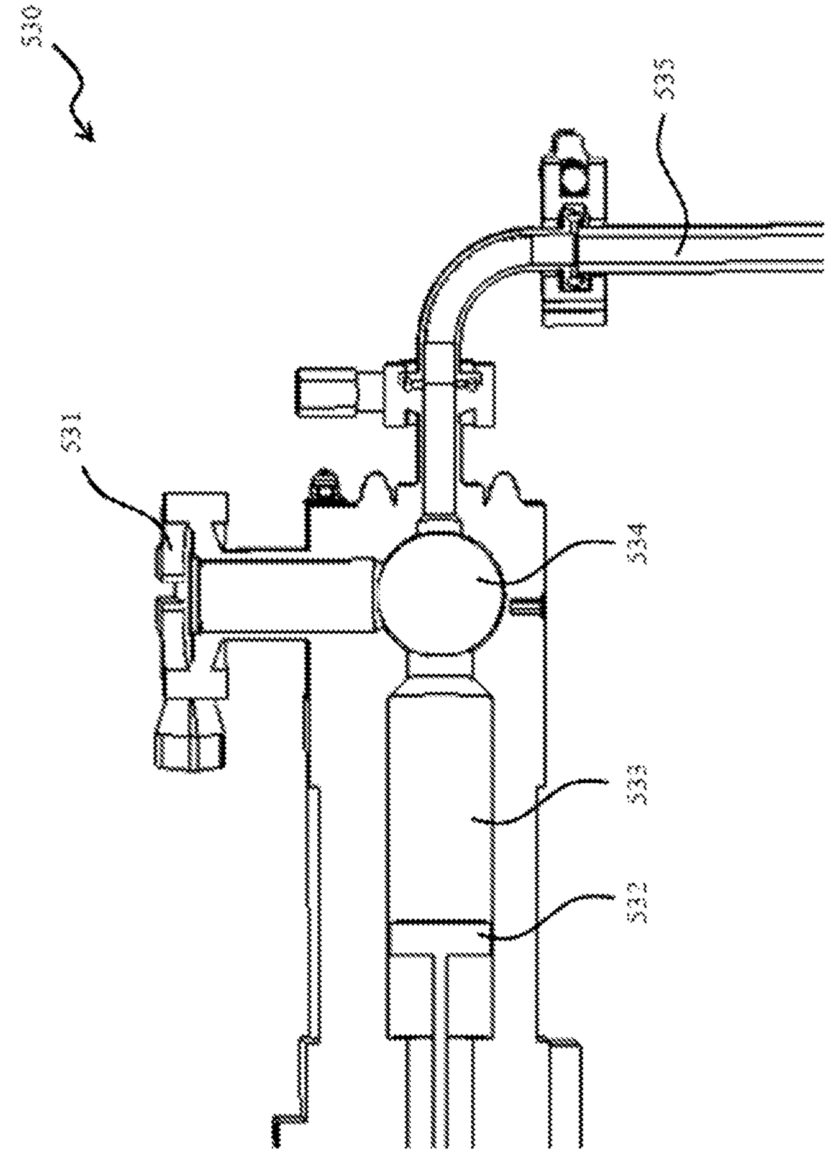
FIG. 7 is a cross-sectional view of a servo-driven piston pump with a ceramic three-way rotary valve from FIG. 5.

FIG. 7 is a cross-sectional view of the servo-driven piston pump 530 from FIG. 5. Preferably, the servo-driven piston pump 530 comprises a fluid inlet 531, an inner piston 532, a fluid dosing chamber 533, a 3-way ceramic rotary valve 534, and a fluid outlet 535. The high viscosity minor feed liquid (not shown) is flown from a pressurized header (not shown) of a second liquid supply (not shown) into the fluid inlet 531 of the servo-driven piston pump 530. During the dosing mode, the minor feed liquid (not shown) passes from the fluid inlet 531 through the 3-way ceramic rotary valve 534 into the fluid dosing chamber 533 as the inner piston 532 retracts to suck in the minor feed liquid. Once a predetermined amount of the minor feed liquid has been pulled into the fluid dosing chamber 533, the servo-driven piston pump 530 is ready to move into the dispensing mode. To begin dispensing the minor feed liquid, a remotely mounted pneumatic solenoid is triggered to cause the 3-way ceramic valve to rotate 90 degrees. When the 3-way ceramic valve so rotates, the fluid communication between the fluid inlet 531 and the fluid dosing chamber 533 is cut off, but rather the fluid communication between the fluid dosing chamber 533 and the fluid outlet 535 is open, thereby allowing the predetermined amount of the minor feed liquid to flow from the fluid dosing chamber 533 out of the fluid outlet 535 and into the unitary dispensing nozzle downstream (not shown). Preferably, the remotely mounted pneumatic solenoid described hereinabove (not shown) is also capable of actuating the pinch valve (not shown) located immediately upstream of the unitary dispensing nozzle, so that the pinch valve is opened to allow the minor feed liquid to flow through the unitary dispensing nozzle downstream. When dispensing of the minor feed liquid is completed, the remotely mounted pneumatic solenoid is triggered to close the pinch valve and to cause the 3-way ceramic valve to rotate back 90 degrees to its original starting position. Correspondingly, the fluid communication between the fluid dosing chamber 533 and the fluid outlet 535 is cut off, and flow of the minor feed liquid is completely cut off.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid dispensing system for dispensing two or more liquids into a container, comprising:

(A) a first liquid source for supplying a first liquid;

(B) a second liquid source for supplying a second liquid that is different from said first liquid in composition, viscosity, solubility, and/or miscibility;

(C) a unitary dispensing nozzle in fluid communication with said first and second liquid sources, said unitary dispensing nozzle is an integral piece free of any movable parts and comprises:

(a) a first end;

(b) a second, opposite end;

(c) one or more sidewalls between said first and second ends;

(d) a plurality of first flow passages for flowing the first liquid through said nozzle, wherein each of said first flow passages is defined by a respective one of a plurality of first inlets and a respective one of a plurality of first outlets; wherein said plurality of first inlets are located at the first end of said nozzle; and wherein said plurality of first outlets are located at the second end of said nozzle to generate a plurality of first liquid flows exiting the plurality of first outlets; and (e) one or more second flow passages for flowing the second liquid through said nozzle, wherein each of said second flow passages is defined by a second inlet and a second outlet; wherein said second inlet(s) is/are located on or near at least one of said sidewalls; wherein said second outlet(s) is/are located at the second end of said nozzle so that said one or more second flow passages extend through said at least one of the sidewalls and the second end of said nozzle; and wherein said second outlet(s) is/are substantially surrounded by said plurality of first outlets such that the plurality of first liquid flows exiting the plurality of first outlets generate a liquid shroud around a second liquid flow exiting said second outlet(s) to reduce an instance of the second liquid flow depositing on a side of the container, (D) a first valve assembly located at or near the first end of said unitary dispensing nozzle for opening and closing said one or more first flow passages; and (E) a second valve assembly located at or near at least one of said sidewalls for opening and closing said one or more second flow passages.

2. The liquid dispensing system of claim 1, wherein said first liquid source is controlled by a servo-driven pump.

3. The liquid dispensing system of claim 2, wherein the servo-driven pump comprises a servo-driven positive displacement pump or a servo-driven rotary positive displacement pump.

4. The liquid dispensing system of claim 1, wherein said first liquid source comprises a storage tank for storing said first liquid under atmospheric pressure.

5. The liquid dispensing system of claim 1, further comprising a flowmeter for measuring the mass or volumetric flow rate of said first liquid supplied by the first liquid source to said unitary dispensing nozzle.

6. The liquid dispensing system of claim 1, wherein said first valve assembly comprises: (i) an air cylinder having an internal piston that divides said air cylinder into an upper chamber and a lower chamber, wherein said piston is capable of moving up and down along said air cylinder when pressurized air is passed into the lower or upper chamber of said air cylinder; (ii) a spring; and (iii) a liquid plunger that is connected with and actuated by said spring and said internal piston of the air cylinder to move between a first position and a second, different position to open and close the one or more first flow passages of the unitary dispensing nozzle.

7. The liquid dispensing system of claim 6, wherein said first valve assembly is actuated by a first remotely mounted pneumatic solenoid that is in fluid communication with a pressurized air supply for passing pressurized air into the lower or upper chamber of said air cylinder so as to effectuate movement of the internal piston.

8. The liquid dispensing system of claim 1, wherein said second liquid source comprises a pressurized header for supplying said second liquid at an elevated pressure.

9. The liquid dispensing system of claim 1, wherein said second liquid source is controlled by a servo-driven pump.

10. The liquid dispensing system of claim 9, wherein the servo-driven pump comprises a servo-driven piston pump with a rotary valve.

11. The liquid dispensing system of claim 10, wherein said the rotary valve of said servo-driven piston pump is actuated by a second remotely mounted pneumatic solenoid to alternate between a dosing mode and a dispensing mode; wherein in said dosing mode, a predetermined amount of said second liquid is dosed by said second liquid source into said servo-driven piston pump; and wherein in said dispensing mode, said predetermined amount of the second liquid is dispensed by said servo-driven piston pump to said unitary dispensing nozzle.

12. The liquid dispensing system of claim 1, wherein said second valve assembly comprises an air-operated valve for opening and closing said one or more second flow passages of the unitary dispensing nozzle.

13. The liquid dispensing system of claim 1, wherein said unitary dispensing nozzle is substantially free of dead space.

14. The liquid dispensing system of claim 1, wherein each of said plurality of first outlets have a circular shape; and wherein said plurality of first flow passages are configured to form the plurality of first liquid flows that are substantially parallel to each other and substantially surround the second liquid flow formed by said one or more second flow passage.

15. The liquid dispensing system of claim 1, wherein said unitary dispensing nozzle comprises a plurality of said first flow passages with a plurality of said first inlets and a plurality of said first outlets; wherein each of said first outlets have a crescent shape; and wherein second outlet(s) is/are located at or near the radius centers of the crescents formed by the first outlets.

16. The liquid dispensing system of claim 1, wherein the ratio of the total cross-sectional area of the first outlet(s) over the total cross-sectional area of the second outlet(s) ranges from about 5:1 to about 50:1.

17. The liquid dispensing system of claim 1, wherein the ratio of the total cross-sectional area of the first outlet(s) over the total cross-sectional area of the second outlet(s) ranges from about 15:1 to about 35:1.

18. The liquid dispensing system of claim 1, further comprising a third liquid source for supplying a third liquid that is different from said first and second liquids in composition, viscosity, solubility, and/or miscibility; wherein said unitary dispensing nozzle is in fluid communication with said third liquid source; wherein said unitary dispensing nozzle further comprises one or more third flow passages for flowing said third liquid through said nozzle; wherein each of said third flow passages is defined by a third inlet and a third outlet; wherein said third inlet(s) is/are located on or near at least one of said sidewalls and is/are spaced apart from said second inlet(s); wherein said third outlet(s) is/are located at the second end of said nozzle, so that said one or more third flow passages extend through said at least one of the sidewalls and the second end of the nozzle; and wherein said third outlet(s) is/are substantially surrounded by said first outlet(s).

19. The liquid dispensing system of claim 1, wherein said plurality of first outlets and the second outlet(s) are configured such that the generated liquid shroud is a diverging liquid shroud around the second fluid flow exiting the second outlet(s) to reduce the instance of the second liquid flow depositing on the side of the container.

20. The liquid dispensing system of claim 1, wherein said plurality of first outlets and the second outlet(s) are configured such that the plurality of first liquid flows exiting the plurality of first outlets are parallel to each other such that the generated liquid shroud is a parallel liquid shroud that enhances a turbulence around the second fluid flow exiting the second outlet(s) to reduce the instance of the second liquid flow depositing on the side of the container.

* * * * *